US00RE33998E

United States Patent [19]

Hampton

[11] E Patent Number: Re. 33,998

[45] Reissued Date of Patent: Jul. 21, 1992

[54] APPARATUS AND PROCESS FOR PRODUCING AN ORGANIC PRODUCT FROM SEWAGE SLUDGE

[76] Inventor: Quentin L. Hampton, 129 Anchor Dr., Daytona Beach, Fla. 32020

[21] Appl. No.: 526,467

[22] Filed: May 21, 1990

Related U.S. Patent Documents

Reissue of:

[64] Patent No.: 3,963,471
Issued: Jun. 15, 1976
Appl. No.: 480,745
Filed: Jun. 19, 1974

[51] Int. Cl.[5] ..... C05F 7/00; B01D 37/03

[52] U.S. Cl. ..... 71/12; 71/13; 210/710; 210/770

[58] Field of Search ..... 71/12, 13; 210/702, 210/705, 710, 713, 770, 771; 34/11

[56] References Cited

U.S. PATENT DOCUMENTS

| | | | |
|---|---|---|---|
| 1,915,240 | 6/1933 | Putnam | 71/12 X |
| 2,023,247 | 12/1935 | Senseman | 241/18 |
| 2,148,447 | 2/1939 | Dundas et al. | 110/220 |
| 2,152,367 | 3/1939 | Smith | 34/34 |
| 2,157,775 | 5/1939 | Smith | 34/34 |
| 2,350,162 | 5/1944 | Gordon | 34/10 |
| 2,977,214 | 3/1961 | McLellan | 71/12 X |
| 3,025,151 | 3/1962 | Berg et al. | 71/12 X |
| 3,342,731 | 9/1967 | Baumann et al. | 210/711 |

OTHER PUBLICATIONS

Enviro-Gro Technologies v. NRG Technologies, et al., U. S. District Court, N. Dist. of Illinois No. CA 89--2-20322 Complaint, Answer, Counterclaims, Reply. Jan. 17, 1990, Discovery Deposition of Richard E. Birner (transcript and deposition exhibits).

"The C-E Raymond Flash Drying and Incineration System for Sewage Sludge Disposal", by Combustion Engineering, Inc. Copyright 1957.

*Primary Examiner*—Ferris H. Lander
*Attorney, Agent, or Firm*—Lowe, Price, LeBlanc & Becker

[57] ABSTRACT

A completely integrated and automated apparatus by which liquid sewage sludge from any sewage or waste treatment plant may be processed into a completely dry, pelletized and sterilized product of an organic nature containing nutrients valuable for the support of plant life. The apparatus involves one completely integrated and automated unit together with a control center by means of which electric circuits program each component of the apparatus to automatically regulate the operation of each component, so that no labor or other manpower is required in the operation, except for observation, lubrication, maintenance and repair of the various motors and machineries involved.

9 Claims, 2 Drawing Sheets

APPARATUS AND PROCESS FOR PRODUCING AN ORGANIC PRODUCT FROM SEWAGE SLUDGE

Matter enclosed in heavy brackets [ ] appears in the original patent but forms no part of this reissue specification; matter printed in italics indicates the additions made by reissue.

BACKGROUND OF THE INVENTION

At the present time, in this country, considerable difficulty and expense are involved in disposing of liquid waste sewage from municipal and privately owned treatment plants. Various types of equipment have been installed, none of which are fully integrated units, but which utilize individual pieces of equipment which function separately, thereby requiring considerable manpower, space and expense in accomplishing the desired sludge drying operation.

SUMMARY

It is a primary object to provide an apparatus and method which may be utilized efficiently and economically to convert objectionable waste liquid sludge, having a water content of 97 to 99 per cent, into a completely dry, pelletized and sterilized product, bagged and ready for sale as a plant nutrient and as a soil conditioner which can be applied by conventional spreaders.

Another object of the invention is to provide such an apparatus and process wherein the resulting end product is of a value far exceeding the cost of processing the material, thus converting the disposal of sewage sludge from a very expensive to a profitable procedure.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 1:
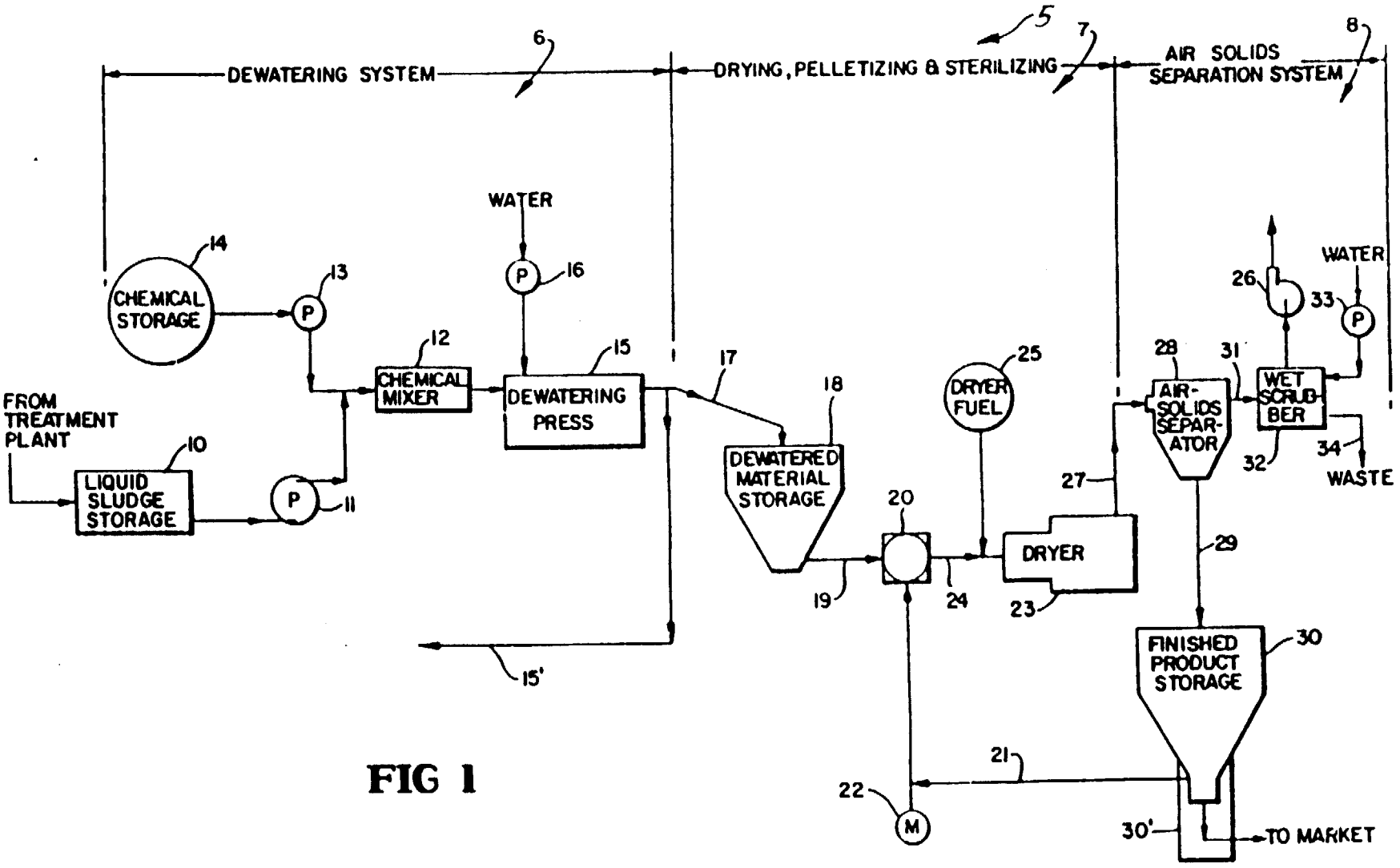
FIG. 1 is a flow sheet representing the various parts of the apparatus and the various steps in the process.

Referring more specifically to the drawings, the apparatus and process for producing a dry, pelletized and sterilized organic product from liquid waste sludge is designated generally 5 and constitutes an integrated unit which includes a dewatering section 6, a drying, pelletizing and sterilizing section 7, and an air-solids separation section 8. The invention also includes an electrical control center 9, FIG. 2, for controlling the operation of the various motors of the apparatus of FIG. 1.

Referring to FIG. 1, the dewatering section includes a receptacle 10 for storing liquid sludge from a sewage treatment plant and which has a water content of 97 to 99 per cent. A pump 11 conveys the sludge from the receptacle 10 to a chemical mixer 12. The pump 11 operates simultaneously with a pump 13 which conveys a chemical from a storage receptacle 14 to the mixer 12. Only a small amount of the chemical is required to coagulate and floculate the solids contained in the liquid sludge in the chemical mixer. The mixture of liquid sludge and chemical is conveyed from the mixer 12 to a dewatering press 15 wherein the free water is pressed from the sludge to reduce the moisture content to about 80 per cent. A pump 16 supplies fresh water by means of a spray system to the dewatering press for continuously cleaning the elements of the press while said press is in operation. The parts 10 to 16, previously described, all constitute elements of the dewatering section.

A conveyor 17 conveys the sludge cake, having a moisture content of approximately 80 per cent, to a dewatered material storage bin 18. Water which has been extracted from the liquid sludge by the dewatering press 15 is returned by way of a conduit 15' by gravity flow to the influent works of the sewage treatment plant. A conveyor 19 conveys the dewatered material from the bin 18 to a mixing chamber 20 where it is mixed with pellets, constituting the final product supplied to the chamber 20 by a conveyor 21 driven by an adjustable motor 22. The final product supplied to the mixing chamber 20 has just been produced and constitutes a hot dry material which can be mixed with the dewatered sludge to a consistency containing a low moisture content, by regulation of the conveyor motor 22, prior to deliver of the mixture from the chamber 20 to a dryer 23, by means of a conveyor 24.

Mixing of the final hot dried product with the moist dewatered sludge cake is necessary to enable drying temperatures to be low enough to prevent formation of clinkers and the ignition of the organic material being fed to the dryer. The percentage of the final product returned to the chamber 20 also determines the size of the pellets produced as the final product. The larger the percentage of the final product returned to the chamber 20, the smaller will be the pellets formed in the dryer 23. Fuel, either gas or petroleum, and ignition is supplied to the dryer 23 by the equipment 25. Air required to support combustion in the dryer 23 is supplied by an air blower 26 which sucks air through the dryer 23 by means of a conduit 27.

The conduit 27 leads from the section 7 into the air-solids separation section 8 where it connects with the inlet of an air-solids separator 28, in which the pelletized, dried and sterilized product falls to the bottom of the separator 28 to be discharged by gravity through a conduit 29 to a finished product storage bin 30. The air from the dryer 23 and separator 28, which contains dust and fine particles of sludge solids, is drawn through a conduit 31 to a wet scrubber 32. Water is conveyed by a pump 33 to the scrubber 32 for cleaning the dust and fine solids from the hot air. These solids in solution are returned to the treatment plant influent by the conduit 34. The blower 26 extracts the waste water from the scrubber 32 and discharges it into the atmosphere as a clean plume of water vapor which condenses rapidly and presents no air pollution problem.

The conveyor 21, previously described, leads from the finished product storage 30 for returning the just produced hot dry pellets to the mixing chamber 20. The remainder of the pellets of the storage bin 30 can either be discharged into a bagging machine 30' for bagging prior to delivery to the market or may be discharged for conveyance in bulk to the market.

Figure 2:
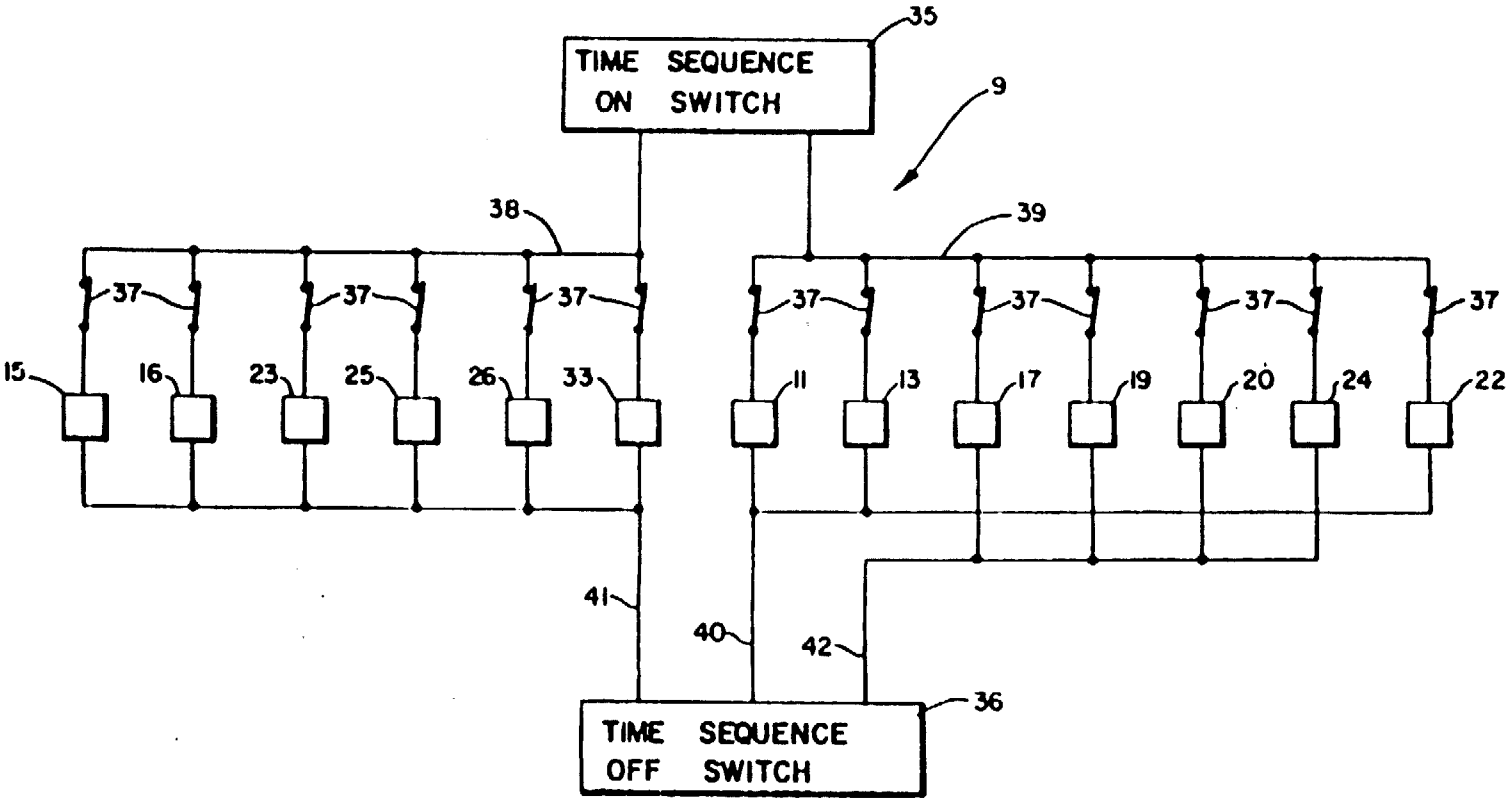
FIG. 2 is a diagramatic view illustrating the electrical control center.

Referring to FIG. 2, the electrical control center 9 automatically governs the operation of the motors and accessories of the apparatus as illustrated in FIG. 1, in such a way as to require no attention of an operator. The control center 9 is operated by a time sequence on switch 35 and a time sequence off switch 36, each of which may be located at some central point in the area of the apparatus of FIG. 1, with wiring, as illustrated in FIG. 2, to each of the motors and other electrical accessories of FIG. 1. Each such motor or other accessory is preferably provided with a normally closed manually operated switch 37, so that any individual motor or other electrically operated device may be shut off or started manually in the event of a breakdown or for necessary testing purposes.

When the switch 35 is energized, circuit 38 will be energized for starting the motor of the dewatering press 15 and the water pump motor 16, so that the press 15 will be entirely wet and in operation before it receives any sludge to be dewatered. Simultaneously, the motor of the dryer 23, the dryer ignition unit 25, the blower 26 and the motor of the pump 33 are energized in order to preheat the drying equipment before the dryer 23 receives any material to be dried.

After a variable predetermined time interval of one to five minutes following the closing of the switch 35, circuit 39 is energized for starting the liquid sludge pump 11 and the chemical pump 13. When this occurs, the liquid sludge together with the chemical are fed into the chemical mixer and this mixture flows to the dewatering press 15. Simultaneously, the motors of the conveyors 17, 19, 22 and 24 are energized together with the mixer motor 20 at which time all electrically actuated elements of the apparatus are functioning.

After a predetermined time interval and when it is desired to discontinue operation of the apparatus, the switch 36 is energized. This initially energized the circuit 40 causing the motors of the sludge pump 11 and chemical feed pump 13 and the conveyor motor 22 to be deenergized. After a predetermined variable time lapse of 5 to 15 minutes, circuits 41 and 42 are deenergized for cutting off automatically the supply of current to all of the other motors and electrical devices.

Various modifictions and changes are contemplated and may be resorted to, without departing from the function or scope of the invention.

I claim:

1. A process for producing an organic product from sewage sludge comprising mixing a predetermined quantity of liquid waste sewage sludge with a chemical for coagulating or flocculating the solids contained in the liquid sludge, subjecting the mixture to pressure for extracting a part of the moisture therefrom, draining off the extracted moisture, heat drying and pelletizing the dewatered material to produce pellets *during the drying*, subjecting the dry pelletized material to a suction action [for separating] *to convey said pellets through the drying and to separate* dust and fine particles of sludge material from the pellets, discharging the separated pellets by gravity to storage, and mixing the dewatered material with a portion of the previously produced pellets for drying and preheating the material prior to the heat drying and pelletizing thereof, so as to enable drying temperatures to be low enough to prevent formation of clinkers and the ignition of the organic material.

2. A process as defined by claim 1, including the step of cleaning and separating the dust and fine particles from air in which the pellets are conveyed.

3. A process as defined by claim 1, including the step of cleaning and separating the dust and fine particles from air in which the pellets are conveyed by wet scrubbing.

4. A process as defined by claim 3, including recycling the separate solids.

5. A process as defined by claim 4, including the step of discharging the moisture laden cleansed air to the atmosphere.

*6. A process for producing an organic product from sewage sludge comprising mixing a predetermined quantity of liquid waste sewage sludge with a chemical for coagulating or flocculating the solids contained in the liquid sludge, subjecting the mixture to pressure for extracting a part of the moisture therefrom, draining off the extracted moisture, heat drying and pelletizing the dewatered material to produce pellets in a dryer, applying suction to the dryer to cause drying air to flow therethrough along with the solids and to convey said pellets from the dryer for separating dust and fine particles of sludge material from the pellets, discharging the separated pellets by gravity to storage, and mixing the dewatered material with a portion of the previously produced pellets for drying and preheating the material prior to the heat drying and pelletizing thereof, so as to enable drying temperatures to be low enough to prevent formation of clinkers and the ignition of the organic material.*

*7. A process for producing an organic product from sewage sludge comprising mixing a predetermined quantity of liquid waste sewage sludge with a chemical for coagulating or flocculating the solids contained in the liquid sludge, subjecting the mixture to pressure for extracting a part of the moisture therefrom, draining off the extracted moisture, heat drying and pelletizing the dewatered material to produce pellets by feeding the dewatered material and drying air to a dryer, heat drying and pelletizing the dewatered material in said dryer by flowing said air and dewatered material concurrently therethrough, and conveying pellets formed within said dryer from said dryer by suction flow of said drying air from said dryer for separating dust and fine particles of sludge material from the pellets, discharging the separated pellets by gravity to storage, and mixing the dewatered material with a portion of the previously produced pellets for drying and preheating the material prior to the heat drying and pelletizing thereof, so as to enable drying temperatures to be low enough to prevent formation of clinkers and the ignition of the organic material.*

*8. A process as defined by claim 7 wherein said separation occurs in an air-solids Separator which receives said air and pellet output of said dryer and separates the air, dust and fine particles from the pellets.*

*9. A process as defined by claim 8 wherein the output of said dryer fed to said separator constitutes air, dust and fine particles and pellets which constitute the product.*

* * * * *